United States Patent [19]
Critchlow

[11] Patent Number: 5,311,545
[45] Date of Patent: May 10, 1994

[54] MODEM FOR FADING DIGITAL CHANNELS AFFECTED BY MULTIPATH

[75] Inventor: David N. Critchlow, San Diego, Calif.

[73] Assignee: Hughes Aircraft Company, Los Angeles, Calif.

[21] Appl. No.: 716,171

[22] Filed: Jun. 17, 1991

[51] Int. Cl.$^5$ .............................................. H03H 7/30
[52] U.S. Cl. ......................................... 375/14; 375/80; 375/86; 375/96; 375/97; 329/304
[58] Field of Search ...................... 375/39, 83, 86, 102, 375/103, 97, 80, 94, 52, 53, 57, 58, 112, 18, 101, 14, 15, 85; 329/304

[56] References Cited

U.S. PATENT DOCUMENTS

| | | | |
|---|---|---|---|
| 4,466,108 | 8/1984 | Rhodes | 375/83 |
| 4,592,075 | 5/1986 | Tsukamoto | 375/83 |
| 4,599,732 | 7/1986 | LeFever | 375/112 |
| 4,631,738 | 12/1986 | Betts et al. | 375/118 |
| 4,644,561 | 2/1987 | Panetn et al. | 375/9 |
| 4,910,467 | 3/1990 | Leitch | 375/83 |
| 4,947,409 | 8/1990 | Raith . | |
| 4,961,206 | 10/1990 | Tomlinson et al. | 375/39 |
| 5,148,452 | 9/1992 | Kennedy et al. | 375/97 |
| 5,150,384 | 9/1992 | Cahill | 375/97 |

OTHER PUBLICATIONS

Onde Electrique, vol. 64, No. 2, Mar. 1984, Paris, France, pp. 101–107, Guidoux L. and Mary L. "Les Circuits pour Modem".

IEEE Global Telecommunications Conference & Exhibition-Globecom '90. vol. 3. 2 Dec. 1990. San Diego, Calif., U.S.A., pp. 1691–1695, Hu Vince: "An Optimized Digital Modem Architecture for VLSI Implementation".

Archiv Fur Elektronik Und Ubertragungstechnik, vol. 34, No. 3, Mar. 1980, Stuttgart De, pp. 133–141, Hespelt V. and Welzenbach M. "Digitale Trager-und Taktableitung fur Quadraturamplitudenmodulations (QAM) Datenubertragungssysteme".

Cselt-Rapporti Technici, vol. V, No. 2, Apr. 1977, Torino, Italy, pp. 91–100, Di Tria P. et al., "Algoritmi di Trattamento del Segnale e Simulazione per un Modem a 3200 Bit/s".

Primary Examiner—Stephen Chin
Assistant Examiner—Don Vo
Attorney, Agent, or Firm—Gordon R. Lindeen, III; William J. Streeter; Wanda K. Denson-Low

[57] ABSTRACT

A receiver designed for use in a mobile environment, which includes an adaptive equalizer driven by phase estimation and rotation circuitry, and which is operable in multipath fading channels. The present invention uses an AFC loop and a phase rotation circuit in front of the adaptive equalizer to improve equalizer performance in the fading channel. The present invention uses $\pi/4$ phase rotation circuitry before a phase quantization decision is made. This $\pi/4$ phase rotation circuitry allows for decisions to be made on a QPSK constellation, rather than on an input 8PSK constellation, thus improving detection performance.

17 Claims, 4 Drawing Sheets

MODEM FOR FADING DIGITAL CHANNELS AFFECTED BY MULTIPATH

BACKGROUND

The present invention relates generally to digital demodulars and, more particularly, to a digital modem adapted for use with transmission channels that are affected by multipath fading.

The prior art related to this invention is generally described in U.S. Pat. No. 4,644,561, assigned to International Mobile Machines Corp. The modem receiver disclosed in this patent is designed for fixed-site applications and is not optimized for the mobile environment. It has been verified by simulation and by testing of operational hardware that this prior art modem does not provide the required bit error rate performance of the IS-54 Digital Cellular Dual Mode standard, and thus, is relatively ineffective in applications wherein multipath fading is experienced.

SUMMARY OF THE INVENTION

In order to overcome the disadvantages of conventional fixed-site demodulators operating in a mobile environment, the architecture of the demodulator of the present invention is specially designed for use in a mobile environment. By including an adaptive equalizer driven by phase estimation and rotation circuitry in the receiver portion of the demodulator, the demodulator is rendered operable in multipath fading channels.

The present invention is unique in its use of an AFC loop and phase rotation circuitry in front of an adaptive equalizer to improve equalizer performance in the fading channel. The present invention is also unique in its use of $\pi/4$ phase rotation circuitry before a phase quantization decision is made. This $\pi/4$ phase rotation circuitry allows for decisions to be made on a QPSK constellation, rather than on an input 8PSK constellation, thus improving detection performance.

The demodulator is a modified and improved version of the demodulator described in U.S. Pat. No. 4,644,561, which was coinvented by the inventor of the present invention. The primary modification to the demodulator of U.S. Pat. No. 4,644,561 patent is the addition of the adaptive equalizer used to combat the effects of multipath fading, commonly found in the digital cellular system environment.

The present demodulator provides acceptable bit error rate performance in a multipath fading channel where other demodulators designed by a classical approach fail. Furthermore, algorithms implemented by the present demodulator allow for processing to be done in a single digital signal processing (DSP) device, which is an inexpensive solution to the multipath fading channel problem. The present demodulator has been developed for digital cellular telephony applications, but may also be used in other low-rate digital applications such as voice or data systems.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
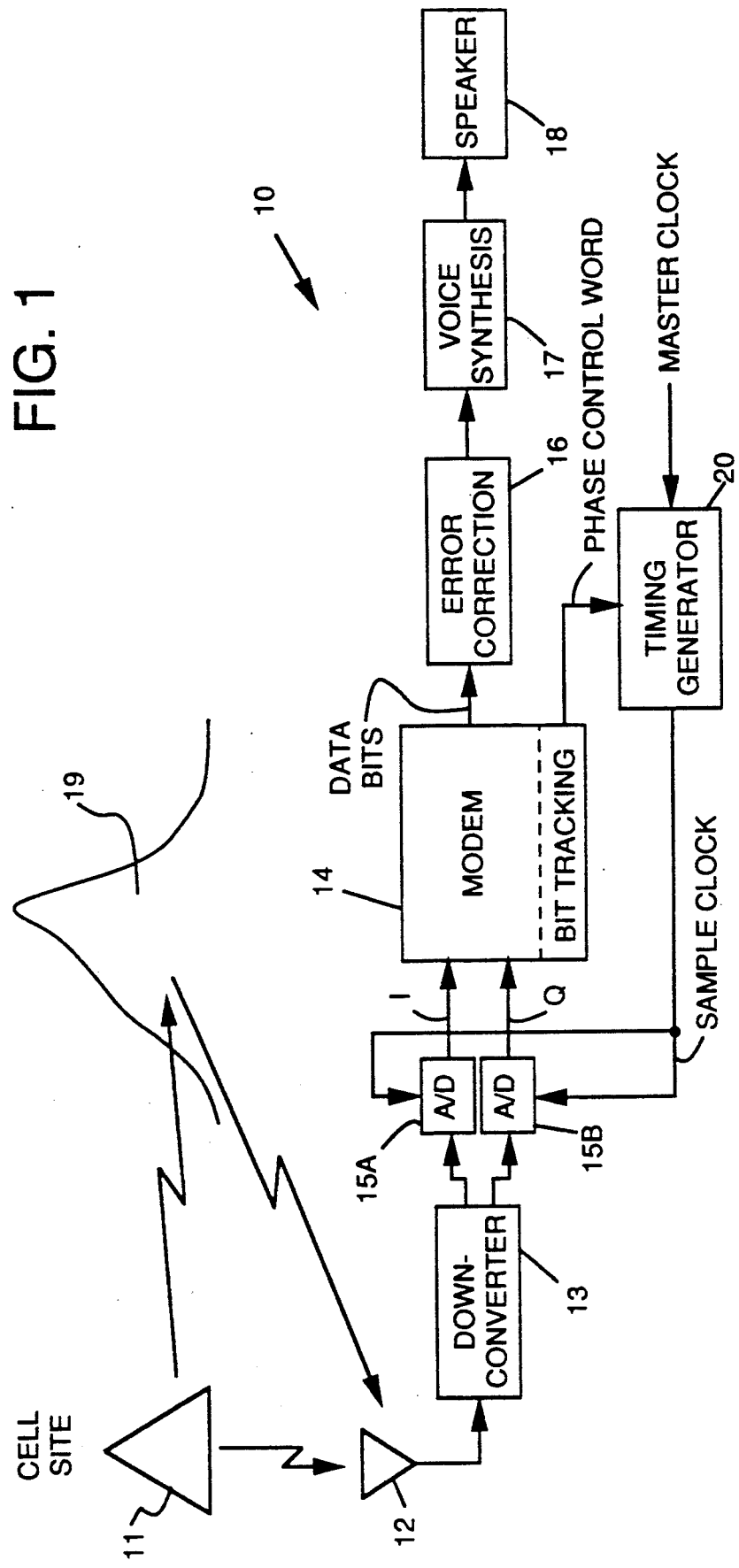
FIG. 1 shows a diagram illustrating a demodulator system employing the principles of the present invention.

Referring to the drawing figures, FIG. 1 shows a diagram illustrating a demodulator system 10 employing the principles of the present invention. The demodulator system 10 is employed in a mobile communications environment such as a mobile cellular telephone environment comprising a cell site 11 that is adapted to transmit messages to mobile vehicles that use the demodulator system 10. The demodulator system 10 includes an antenna 12 that is coupled by way of a downconverter 13 through first and second A/D converters 15A, 15B to a modem receiver 14 in accordance with the present invention. A master clock input signal is coupled to a timing generator 20 whose output is a sample clock signal that is coupled to the first and second A/D converters 15A, 15B. Data bits produced by the receiver 14 are coupled to error correction circuitry 16 and then to voice synthesis circuitry 17 and then to a speaker 18, for example. In the mobile environment, signals transmitted from the cell site 11 are directly received by the antenna 12, but in many instances, reflections of the transmitted signals from a mountain 19, or building, for example, causes the same signals to be received at the antenna 12 after a time delay. This commonly causes multipath interference in the receiver 14.

Figure 2:
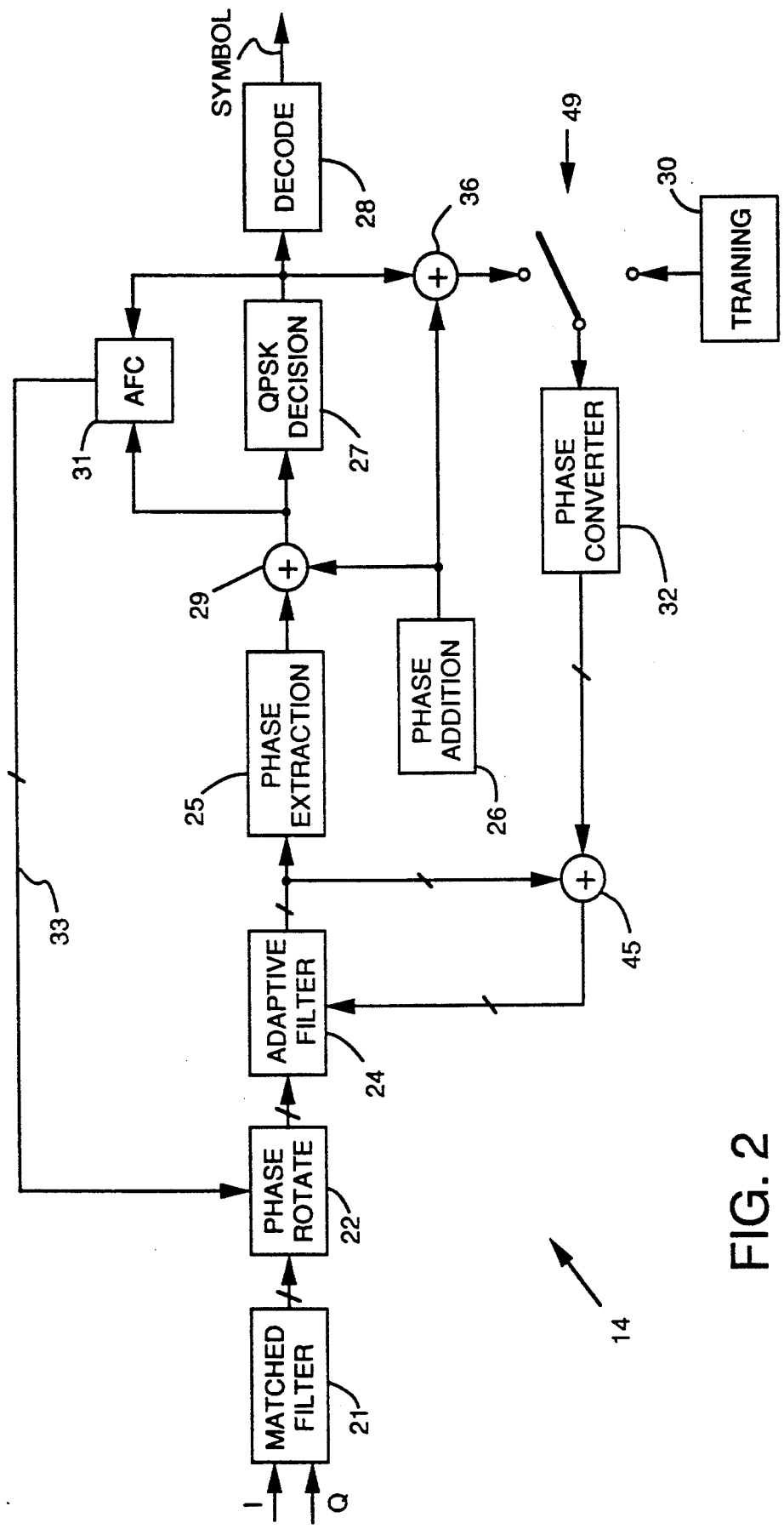
FIG. 2 is a generalized block diagram showing the architecture of the receiver of the demodulator system of FIG. 1 in accordance with the principles of the present invention.

In order to overcome the multipath interference problem in the cellular environment, the present invention provides for a digital receiver 14 whose generalized block diagram is shown in FIG. 2. The receiver 14 is comprised of a fixed matched filter 21 disposed at its input whose response is matched to the impulse response of the transmitter (not shown) at the cell site 11, and which is designed to maximize the signal to noise ratio of the incoming signals. Outputs of the fixed matched filter 21 are coupled to first inputs of a phase rotation circuit 22. Outputs of the phase rotation circuit 22 are coupled to a variable adaptive filter or adaptive equalizer 24. Outputs of the adaptive equalizer 24 are couple to phase extraction circuitry 25 that determines the phase of I and Q signals. Thereafter, $\pi/4$ phase signals from phase addition circuitry 26 are subtracted from the phase signals from the phase extraction circuitry 25 in a first summing circuit 29, and from this signal a QPSK phase decision is made in phase decision circuitry 27. This decision determines which phase "quadrant" the phase signal is in.

The decision made by the phase decision circuitry 27 is then decoded in a gray decoding circuit 28 to produce data symbols. The output from the phase decision circuitry 27 is summed with the output from the phase addition circuitry 26 in a second summing circuit 36, with the resultant sum being fed back towards the adaptive equalizer 24 by way of a switching device 49 and a phase converter 32 and are combined with outputs of the adaptive filter 24 in a third summing circuit 45. The output from the second summing circuit 36 is converted to I and Q signals in the phase converter circuit 32. The summed output signals from the third summing circuit 45 and the input signals from the phase rotation circuitry 22 are processed in the adaptive filter 24 to adaptively filter the signals. A training circuit 30 is provided that is switched into the feedback loop in lieu of the phase signals in order to train the adaptive filter 24. An automatic frequency control (AFC) bit tracking circuit 31 is employed to sample the signals before and after the phase decision circuitry 27 and to provide a control signal that is fed back to the phase rotation circuitry 22 in order to track the incoming phase of the received data signals, and fed back, to the downconverter 13 (FIG. 1) to control its VCXO oscillator (not shown).

Figure 3:
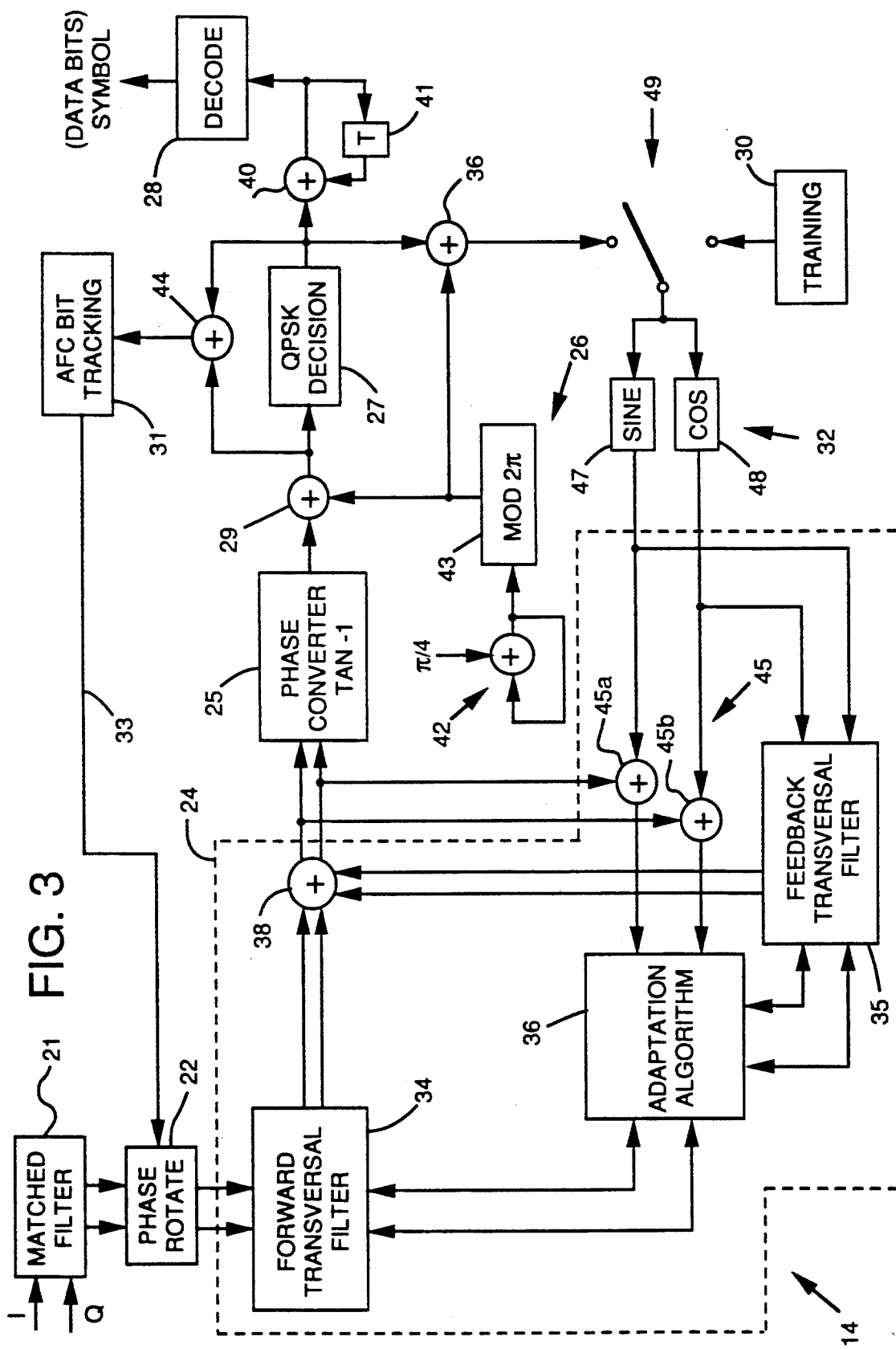
FIG. 3 is a more detailed block diagram of the receiver of FIG. 2.

Referring now to FIG. 3, a detailed block diagram of the architecture of the receiver 14 of FIG. 2 is shown. Each of the components, with the exception of the adaptive filter 24, are conventionally used processing components found in conventional digital modems. However, the overall architecture of the receiver 14 and the adaptive filter 24 shown in FIG. 3 are novel.

More specifically, the receiver 14 comprises the fixed matched filter 21 disposed at its input and whose output is coupled to the phase rotation circuit 22. The output of the phase rotation circuit 22 is coupled to the adaptive filter 24. The adaptive filter 24 comprises a forward transversal filter 34, a feedback transversal filter 35, an adaption algorithm 36 that may be formed as part of the logic of a DSP, for example, or may be implemented by way of a software program run on the DSP, a fourth summing circuit 38 to which the forward and feedback filters 34, 35 are coupled, and the third summing circuit 45 comprising two summing circuits 45a, 45b.

Outputs of the forward transversal filter 34 are coupled to respective inputs of the fourth summing circuit 38. Outputs of the fourth summing circuit 38 are coupled to respective inputs of the phase converter or extraction circuit 25. The output of the phase converter circuit 25 is coupled to an input of a fifth summing circuit 29, whose output is coupled to the QPSK decision circuit 27 and to the Gray decode circuit 28 by way of a sixth summing circuit 40 that is fed at a subtracting input thereof by a first delay element (T) 41. The delay element 41 and sixth summing circuit 40 comprise an integrator of the decisions provided by the decision circuit 27. The Gray decode circuit 28 is adapted to provide the detected symbols in a conventional manner.

In order to strip the 45 degree phase advance encoded onto the received symbols, which is required under the IS-54 cellular standard, the phase addition circuit 26 is provided. The phase addition circuit 26 is comprised of a seventh summing circuit 42 having a $\pi/4$ phase input, and a MOD $2\pi$ circuit 43. An output of the phase addition circuit 26 is coupled to a subtracting input of the fifth summing circuit 29, which is configured to sequentially subtract the $\pi/4$ phase from the output of the phase converter 25.

The stripped output of the fifth summing circuit 29 is coupled to the QPSK decision circuit 27, and to the AFC bit tracking circuit 31 by way of an eighth summing circuit 44, and the output of the AFC bit tracking circuit 31 is fed back to the phase rotation circuit 22 by way of a feedback loop 33. The output of the QPSK decision circuit 27 is also combined with the input to the QPSK decision circuit 27 in the eighth summing circuit 44. The details of the AFC bit tracking circuit 31 are shown in FIG. 4, and will be discussed in more detail below.

Figure 4:
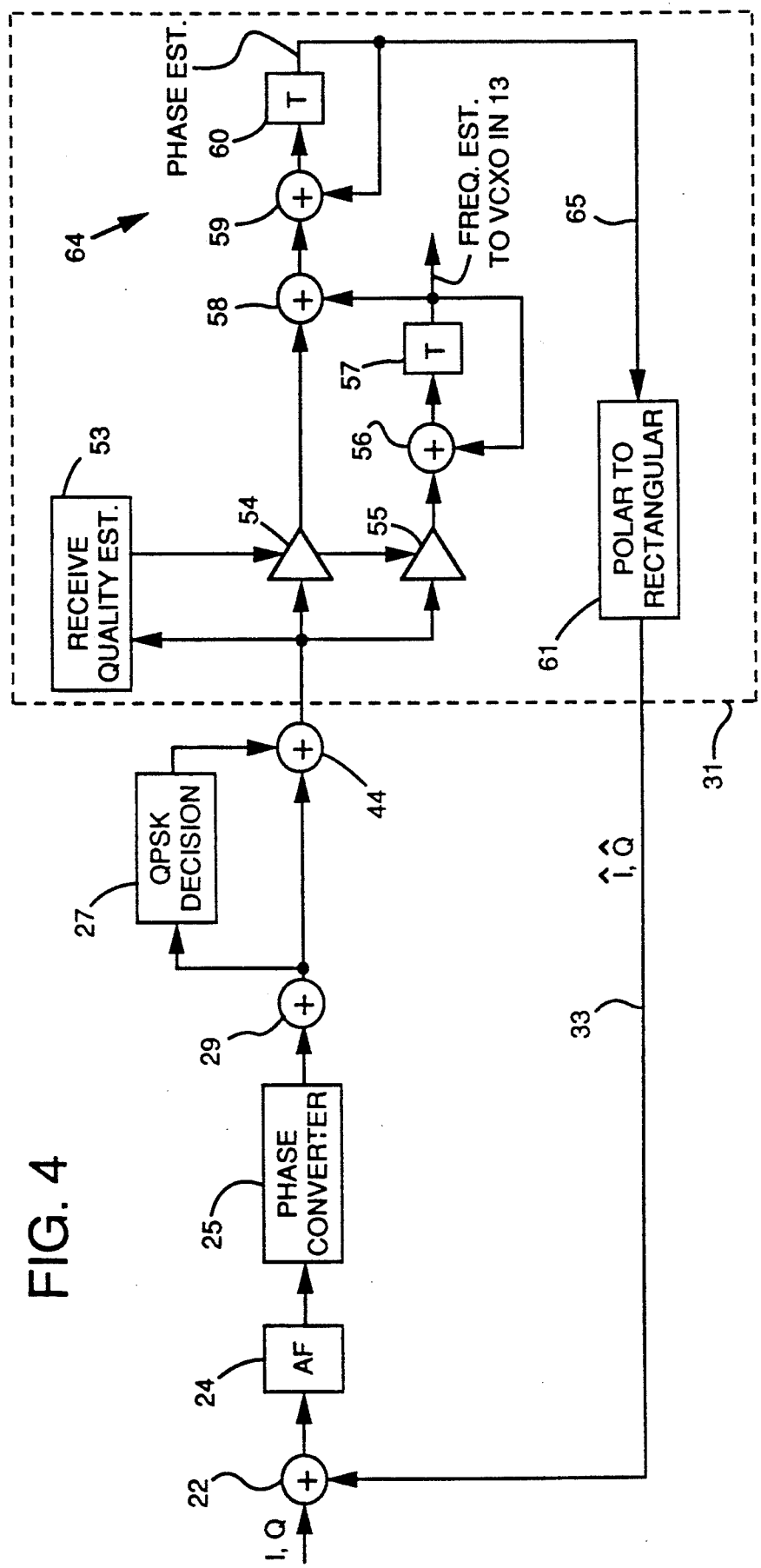
FIG. 4 is a diagram detailing the phase/frequency lock loop employed in the receiver shown in FIG. 3.

Referring to FIG. 4, it illustrates the AFC bit tracking circuit 31 in greater detail, along with its connection to other circuit components. The AFC bit tracking circuit 31 derives its input from the output of the eighth summing circuit 44, which in turn has been derived from the input to and the output of the QPSK decision circuit 27. An output of the eighth summing circuit 44 is coupled to a first gain element 54 whose output is coupled through sequentially coupled ninth and tenth summing circuits 58, 59 to a second delay element (T) 60 whose output provides an estimate of the phase of the input signals. The second delay element 60 and the ninth summing circuit 59 comprise an integrator and a primary loop of the AFC bit tracking circuit 31.

The phase estimate value is fed back to the tenth summing circuit 59 and is combined with its other input signal, and is also coupled to both the phase rotation circuit 22, via a polar to rectangular circuit 61. The receive quality estimate circuit 53 controls the respective gains of the the first and second gain elements 54, 55. The gains are controlled by the following algorithm: if the absolute value of the error signal at the output of the eighth summing circuit 44 is less than a predetermined threshold, then $i=i+1$, else $i=i-1$, where $i$ is used as an index to a table of gain constants that are then applied to the respective first and second gain elements 54, 55. Consequently, arrays of gain elements $c(i)$, $d(i)$ are stored for the two gain elements 54, 55. Instead of using the value of $i$ directly, specific values of $c(i)$ and $d(i)$ stored in the table are used as the gain values. An output of the second gain element 55 is coupled by way of a eleventh summing circuit 56 to the input of a third delay element (T) 57 whose output is coupled to a second input of the ninth summing circuit 58, and is provided as a frequency estimate that is fed back to the VCXO oscillator in the downconverter 13.

In operation, and referring again to FIG. 3, the forward transversal filter 34 processes the channel inputs and input signals provided by the adaption algorithm 36, while the feedback transversal filter 35 processes decision inputs and input signals provided by the adaption algorithm 36. The input to the phase converter 25 is a cleaned up channel signal and subsequent to processing using the phase signals provided by the phase addition circuit 26, provides QPSK symbols upon which a QPSK decision is made by the QPSK decision circuit 27. Lookup tables 47, 48 are provided as part of the phase conversion circuit 32 to convert the QPSK phase back to 8PSK phase code to get to the frame of reference of the adaptive filter 24.

The outputs of the phase stripping circuit 26 and the QPSK decision circuit 27 are coupled to the second summing circuit 36, whose output is coupled to a switching device 49. The switching device 49 permits inputs to the adaptive filter 24 to be provided by the output of the QPSK decision circuit 27, or from the training pattern circuit 30, that is adapted to train the adaptive filter 24. An output from the second summing circuit 36 or the training pattern circuit 30 are coupled to the sine and cosine lookup tables 47, 48 of the phase conversion circuit 32, which may comprise 8 locations each, for example, and which provide I and Q output signals in response to the signals provided by the second summing circuit 36 or training pattern circuit 30. Outputs of the respective sine and cosine lookup tables 47, 48 are individually coupled to third summing circuit 45, shown as the two summing circuits 45a, 45b for the I and Q channels, whose respective second inputs are the respective I and Q outputs of the fourth summing circuit 38.

A more detailed explanation of the operation of the receiver 14 is as follows. I and Q samples are applied to the digital matched filter 21 from the downconverter 13 at the rate of two complex samples per symbol time. At the front-end of the receiver 14 is the fixed filter 21, whose response is matched to the transmitter impulse response. The preferred implementation is a fractionally-spaced filter, sampled at twice the sampling rate. This provides bit timing stability as well as improved adjacent channel rejection. The output of the fixed filter 21 is a single I, Q pair per symbol time to be directed into the phase rotation circuit 22.

An estimate of the absolute phase offset between transmitter and receiver is fed by way of the AFC loop 33 from the AFC bit tracking circuit 31 to the phase rotation circuit 22 and is used to rotate the incoming phase samples for use by the adaption algorithm 36. The phase estimate from the AFC loop 33 is an estimate of the (potentially time-varying) phase offset. This value is the estimate from a second order phase and frequency estimation loop 65, and has the ability to track frequency offsets of up to 1 kHz. The equations that the AFC bit tracking circuit 31 uses are designed to provide this type of frequency tracking.

The reason for placing the phase rotation circuit 22 before the adaptive filter 24 is to keep the PSK constellation points fairly stable for the adaption algorithm 36. If no phase rotation were done, the adaption algorithm 36 would vary the filter taps in real time to compensate for phase offsets. This operation works well if the phase offset is fixed between transmitter and receiver. If the phase varies over time due to a frequency offset, errors are induced because the equalizer time-constant is not small enough to track phase deviations caused by these larger frequency offsets.

The forward and feedback transversal filters 34, 35 are controlled by the adaption algorithm 36. Both the forward and feedback transversal filters 34, 35 preferably comprise tap-spaced equalizers. The tap-spaced equalizer in the forward direction addresses the complexity and stability of the equalizer adaption algorithm 36. Complexity goes up by a factor of from 2 to 4 when a fixed matched filter 21 is used since the number of samples leaving and entering its data shift register is two instead of one. However, it is also possible to use a fractionally spaced forward transversal filter instead of the tap-spaced filter 34 to achieve finer resolution.

The feedback transversal filter 35 is a simple integer-spaced transversal filter, used primarily for intersymbol interference (ISI) cancellation due to multipath effects. The input to feedback transversal filter 35 substantially comprises the output of the QPSK decision circuit 27. To program the feedback transversal filter 35, during training times, a known equalizer training sequence is applied to the feedback transversal filter 35 from the training circuit 30.

The phase/frequency lock loop, comprising the AFC bit tracking circuit 31, is shown in FIG. 4. The AFC bit tracking circuit 31, is designed with minimal loop noise bandwidth to minimize phase noise that corrupts the received estimates. At the same time, this loop is designed so that the acquisition time, which becomes longer as the loop noise bandwidth becomes narrower, is within an acceptable range.

When a deep fade occurs, the algorithm (outlined above) is employed in the receive quality estimate circuit 53 that keeps the last frequency in place and does not wander until signal quality has returned to an acceptable level. The signal quality estimate is determined using the algorithm by looking at the phase error out of the QPSK decision circuit 27. When the signal quality is above a certain set threshold, the receiver 14 operates in a narrow loop mode. When the channel quality dips below this threshold, the tracking loops are widened and VCXO control lines are not modified until after the low quality condition is removed. When the condition is removed, the AFC bit tracking circuit 31 begins operation again as normal, continuing to actively update the loop parameters. The AFC bit tracking circuit 31 adjustment is achieved by way of manipulation of loop gain elements 54, 55 using the quality estimate circuit 53.

The first part of the detection process comprises taking the I and Q samples from the forward equalizer 34 and performing a table lookup to provide an angular phase value. This is done via sine and cosine lookup tables in the phase converter 25, such as sine and cosine lookup tables 47, 48 used for phase conversion in the phase converter 32.

The structure of the receiver 14 is that of a coherently demodulated, differential detector. The input phase is rotated to account for the $\pi/4$ phase rotation at the transmitter. The detector quantizes the input phase to one of four QPSK quadrants. The detector output is subtracted from the previous detector output to produce differential phase. This difference is then Gray decoded. The $\pi/4$ phase rotation accumulator value provided by the phase addition circuit 26 is added back to the detector output in order to produce the "true phase" of the input samples for the feedback transversal filter 35. A n output of the AFC bit tracking circuit 31 is utilized as a VCXO control signal for the downconverter 13. This control signal is smoothed prior to being inputted to the VCXO control electronics (not shown). This control electronics provides voltage to drive the VCXO to the correctly locked frequency.

A bit timing estimate is computed once at the end of a received burst (RX) based upon the I and Q samples taken during that burst. The bit timing recovery scheme is based upon the accumulated value of phase errors within the AFC bit tracking circuit 31. Any DC tendencies of this phase error estimate are used to correct the bit timing offset. More particularly, the AFC bit tracking circuit 31 includes computing means (not shown) for implementing an algorithm based upon the above parameters, to thereby produce an output "phase control word" which is fed to a variable timing generator 20. The timing generator 20 creates a strobe (sample clock signal) that is fed to the A/D converters 15A, 15B (FIG. 1) to sample the incoming signal at the correct time as determined by the algorithm. The timing generator 20 creates a signal at 48.6 kHz (twice per sample time). The algorithm controls the phase of the timing strobe, in that it advances or delays the timing signals in order to align the timing strobe with the timing of the incoming RF signal.

AGC is performed by a baseband demodulator (not shown) in the downconverter 13 in order to bring the IF signal level fed into A/D converter circuits 15A, 15B to a nominal level, in accordance with an algorithm that looks at the I and Q inputs being processed for delivery to the analog to digital converter, finds the amplitude of the received signal, and computes a logarithmic (decibel) difference between the actual input level and the desired input level. This difference is used as an index to a PROM-based lookup table comprising the receive quality estimate circuit 53 for controlling gain settings in the AFC bit tracking circuit 31.

Thus there has been described a new and improved digital demodulator adapted for use with transmission channels that are affected by multipath fading. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A receiver for processing a transmitted symbol received by way of at least two transmission paths, the transmission paths having at least some noise, said receiver comprising:
   an antenna for receiving the transmitted symbol;
   a downconverter for converting the received symbol into corresponding I and Q digital signals;
   a matched filter coupled to the downconverter for increasing the signal to noise ratio of the I and Q digital signals;
   phase rotation means for rotating the phase of the filtered I and Q digital signals by a computed amount to provide phase rotated signals;
   an adaptive matched filter coupled to the phase rotation means for processing the phase rotated signals and for adaptively filtering the signals to produce phase coherent I and Q signals;
   a phase extraction circuit coupled to the adaptive matched filter for converting the phase coherent I and Q signals into corresponding adaptively filtered phase signals;
   a phase detection circuit coupled to the phase extraction circuit for converting the adaptively filtered phase signals into a corresponding plural bit pattern representative of the symbol; and
   phase decoding means for decoding said plural bit pattern, to thereby produce the symbol.

2. A receiver for use with a modulator transmitter that is adapted to sequentially transmit digitally encoded data symbols having a predetermined phase advance sequentially encoded thereon at a predetermined transmit frequency, over a fading digital channel subject to noise and having multiple transmission paths, said receiver comprising:
   an antenna for receiving the digitally encoded data symbols;
   a downconverter for converting the received digitally encoded data symbols into corresponding I and Q digital signals;
   a fixed matched filter having a fixed fractional tap spacing matched to the impulse response of the transmitter, coupled to the downconverter for increasing the signal to noise ratio of the I and Q digital signals;
   phase rotation means for rotating the phase of the filtered I and Q digital signals by a predetermined amount to provide phase rotated signals;
   an adaptive matched filter coupled to the phase rotation means for adaptively filtering the phase rotated signals, to thereby produce phase coherent I and Q signals;
   a phase converter coupled to the adaptive matched filter for converting the phase coherent I and Q signals into corresponding adaptively filtered phase signals; and
   phase decoding means for stripping the phase advance from the adaptively filtered phase signals, to thereby produce the symbols.

3. In a receiver, a method of processing digital I and Q samples derived from data symbols that are transmitted by way of multiple paths from a transmitter having a predetermined impulse response, in order to produce demodulated data symbols, said method comprising the steps of:
   filtering the I and Q samples by means of a fixed tap filter that is matched to the impulse response of the transmitter;
   rotating the phase of the filtered I and Q samples to provide phase rotated signals;
   adaptively filtering the phase rotated signals;
   determining the phase associated with the phase rotated signals;
   decoding the phase of the signals to produce the demodulated data symbols.

4. A receiver for processing a transmitted symbol, the receiver comprising:
   a downconverter for converting a receiver transmitted symbol into corresponding I and Q digital signals;
   a phase rotator for rotating the phase of the I and Q digital signals by a computed amount;
   an adaptive matched filter coupled to the phase rotator for adaptively filtering the signals to produce phase coherent I and Q signals from the phase rotated signals; and
   a converter comprising a phase extraction circuit coupled to the adaptive matched filter for converting the phase coherent I and Q signals into corresponding adaptively filtered phase signals and then to a data symbol.

5. The receiver of claim 4 comprising an automatic frequency control tracking circuit coupled to the converter for sampling the phase of the signals in the converter and controlling the phase rotator in accordance therewith.

6. The receiver of claim 5 wherein the converter comprises a phase detection circuit for converting the coherent I and Q signals into a plural bit pattern representation of the I and Q signals and wherein the frequency tracking circuit is coupled to the converter through a first coupling to the input to the phase detection circuit and a second coupling to the output of the phase detection circuit.

7. The receiver of claim 6 wherein the frequency tracking circuit produces an estimate of the frequency of the signals in the converter for regulating the operation of the downconverter.

8. The receiver of claim 4 wherein the converter comprises a phase detection circuit coupled to the phase extraction circuit for converting the adaptively filtered phase signals into a corresponding plural bit pattern representative of the symbol.

9. The receiver of claim 6 wherein the converter comprises a phase decoder for decoding the plural bit pattern representation, to thereby produce the symbols.

10. The receiver of claim 9 wherein the phase decoder comprises a phase addition circuit for stripping a phase advance from the phase coherent I and Q signals.

11. In a receiver, a method of processing digital I and Q samples derived from data symbols that are transmitted from a transmitter having a predetermined impulse response, in order to produce demodulated data symbols, said method comprising the steps of:

- filtering the I and Q samples by means of a fixed tap filter that is matched to the impulse response of the transmitter;
- rotating the phase of the the filtered I and Q samples to provide phase rotated signals;
- adaptively filtering the phase rotated signals;
- determining the phase associated with the phase rotated signals; and
- decoding the phase of the signals to produce the demodulated data symbols.

12. A receiver for processing a transmitted pi/4 QPSK symbol comprising:

- a downconverter for converting the pi/4 QPSK symbol into corresponding I and Q digital signals;
- a phase addition circuit for subtracting a pi/4 phase input from the I and Q signals to produce QPSK I and Q signals;
- a QPSK phase detection circuit for converting the QPSK I and Q signals into a coherent bit pattern representation of the QPSK I and Q signals; and
- a phase decoder for decoding the coherent bit pattern representation to produce the symbol.

13. The receiver of claim 12 wherein the phase addition circuit comprises a pi/4 phase input summer, the output of which increments each symbol and is coupled to a MOD 2 pi filter the output of which is coupled to a summer, the summer subtracting the MOD 2 pi filter output from the I and 2 signals.

14. The receiver of claim 12 further comprising a phase rotator for rotating the phase of the I and Q signals from the downconverter by a computed amount.

15. The receiver of claim 14 wherein the phase detection circuit comprises an adaptive matched filter for adaptively filtering the I and Q signals to produce phase coherent I and Q signals from the phase rotated signals.

16. The receiver of claim 14 further comprising an automatic frequency control tracking circuit coupled to the output of the phase detection circuit for sampling the phase of the signals output from the phase detection circuit and controlling the phase rotator in accordance therewith.

17. The receiver of claim 16 further comprising a phase conversion circuit for converting the QPSK I and Q signals from the phase addition circuit into pi/4 QPSK signals for sampling by the frequency tracking circuit.

* * * * *